United States Patent
Mihalakis

Patent Number: 6,034,817
Date of Patent: Mar. 7, 2000

[54] IMAGE PROJECTION BEAM TRANSMISSION APPARATUS

[76] Inventor: George M. Mihalakis, 406 Coelho St., Milpitas, Calif. 95035

[21] Appl. No.: 09/276,421

[22] Filed: Mar. 25, 1999

[51] Int. Cl.[7] .......................... G03B 21/56; G03B 21/60
[52] U.S. Cl. ............................................ 359/454; 359/460
[58] Field of Search .................................. 359/443, 451, 359/455, 456, 460, 459, 454

[56] References Cited

U.S. PATENT DOCUMENTS

| | | | |
|---|---|---|---|
| 2,804,801 | 9/1957 | Mihalakis | 88/28.9 |
| 2,984,152 | 5/1961 | Mihalakis | 88/28.9 |
| 3,063,339 | 11/1962 | Mihalakis | 88/28.9 |
| 3,994,562 | 11/1976 | Holzel | 350/129 |
| 4,241,980 | 12/1980 | Mihalakis et al. | 350/129 |
| 4,490,010 | 12/1984 | Honda et al. | 350/128 |
| 4,536,056 | 8/1985 | Oguino | 350/128 |

*Primary Examiner*—David M. Gray
*Assistant Examiner*—Christopher Mahoney
*Attorney, Agent, or Firm*—Lyon & Lyon LLP

[57] ABSTRACT

An image projection beam transmission apparatus includes a sheet of optical bulk material having a planar material exit surface and an optical surface. An optical axis is substantially perpendicular to a plane defined by said optical surface. The optical surface comprises a matrix of focusing lens units. Each focusing unit has separate and distinct optical refracting curvature in both a first principle axis, which is perpendicular to the optical axis and a second principle axis, also perpendicular to said optical axis. The first principal axis is perpendicular to the second principal axis. Each of the optical focusing elements is disposed in substantially contiguous and integral relation, and repeats along the first and second principle axes. Each lens unit comprises an optically transmitting refractive surface constructed by displacing in the optical axis with respect to the first principle axis a singularly distinct and constant second order curve residing in a plane defined by the optical axis and the second principle axis.

18 Claims, 11 Drawing Sheets

IMAGE PROJECTION BEAM TRANSMISSION APPARATUS

FIELD OF THE INVENTION

The present invention relates generally to image projector output beam control apparatus of a transmissive nature and more particularly to screens used in rear-projection televisions systems (RPTV).

BACKGROUND OF THE INVENTION

In recent years, there have been increased demands placed on display devices used to display images such as images generated by television, computer displays and the like. These demands include demand for larger images, while at the same time presenting these larger images with increased brightness, contrast, and perhaps most importantly, resolution. The most common method of expressing the resolution of a display device is by expressing the pixel density of a display device. A "pixel" is the basic 'picture element' of an image (sometimes referred to as 'pels'). The term pixel usually applies to the quantification of electronic images, which are composed of an array of pixels that each define a tiny portion of the image. This array of image picture elements is usually specified by a vertical number and a horizontal number, the product of which is the total number of pixels.

The need for large, high resolution display devices is becoming even more important because the United States and other countries are in the process of shifting from an analog, low resolution television delivery system, to a digital, high resolution delivery system, sometimes referred to as "high-definition television", or "HDTV". In terms of resolution, the current television delivery system in North America, known as NTSC (this format was developed by the National Television Standards Committee-hence the format has been named NTSC), has a resolution of approximately 425 by 565 pixels, thereby providing approximately 240,125 total pixels. A typical cable television system delivers even less resolution, approximately 350 by 466 pixels (163,100 total pixels). While there are as many as eighteen different formats proposed for digital television, there are approximately three different resolutions likely to be used by broadcasters and cable companies. These formats are base digital television, 480 by 640 pixels (307,200 total pixels), low HDTV, 720×1280 pixels (921,600 total pixels), and high (or full) HDTV, 1080 by 1920 pixels (2,073,600 total pixels).

Thus, a television capable of displaying full HDTV resolution must have the ability to display nearly nine times as much picture information (i.e., nearly nine times as many pixels) as current NTSC broadcasts require. This dramatic increase in resolution places demands on both the "engine" used to create the image, and the screens used to display the image. Current television display technology is not capable of efficiently displaying full HDTV resolution. By far the most popular large screen television system is the rear projection television, known as RPTV. A typical RPTV uses three cathode ray tubes that project picture data onto the rear of a transmission screen. The screen then distributes the picture data into an image viewing field, within which the viewer can see it. It is anticipated that other display technologies will be developed that are capable of higher resolution than projection cathode ray tube technology. Examples of newer projector technologies include liquid crystal displays (LCDs), which are often implemented with transmissive thin film transistors (TFT), and reflective silicon projectors (often referred to as digital light valves). These new technologies also promise to be less expensive than cathode ray tube technology, and importantly, deliver the projected image beam to the screen using only one projection lens instead of the three lenses common to CRT projectors.

Thus, as newer high performance projector engines are developed, a significant limiting factor in displaying high-resolution television images is the screen upon which the projector transmits picture data. Virtually every RPTV sold today utilizes what is known as a tooled micro-optic, hybrid diffusion/refractor type screen like those disclosed in U.S. Pat. Nos. 4,536,056 and 4,490,010 and available from the DNP Company of Japan. This screen is useful only with 3-lens CRT projectors and has no direct application to the new single-lens projectors. While these prior art screens are capable displaying the relatively low-resolution NTSC picture, they are not capable of displaying full HDTV images without being made impracticably large.

Thus, there is a strong need for a new type of screen that is capable of displaying high definition television signals with high resolution while providing high contrast, flexible viewing angles and brightness containment characteristics suitable for viewing in a room with large amounts of ambient light. Note that the term "containment" is a term used to describe 'boundary control', or how much of the image light is contained in the intended viewing field.

In U.S. Pat. No. 4,241,980 to Mihalakis ("the Mihalakis '980 patent), a reflection or transmission screen was disclosed where substantial boundary control of the reflected or transmitted light could be achieved while at the same time substantially excluding extraneous light. Thus, the Mihalakis '980 patent disclosed a screen that considerably increased the quantum of incident light comprising the image that was transmitted to the far-field viewing zone relative to surrounding lighting conditions. This was achieved by the construction of a repeating optical array element combining the lens focusing power of individual concave and convex elements into one single element, a plurality of which comprised the projection screen. This optical array element, which was based on compound optical curvatures in both planes perpendicular to the optical axis through its combination of convex and concave focusing properties, provided a higher degree of light distribution field control over previous element designs.

Fundamental to the screen disclosed in the Mihalakis '980 patent as well as to other prior art was the mathematical construction of lens or focusing elements with curvature functions that are compound in the two axes perpendicular to the optical axis. This is equivalent to stating that the curvature function in the direction of one principal axis perpendicular to the optical axis is modulated in the direction of the other principal perpendicular axis. This results in a mixed, or compound curvature function along all other directions between the two principal axes of the surface and between any two parallel cross-sections of the surface.

While the projection screen disclosed in the Mihalakis '980 patent represented an advance in gain distribution properties over earlier projection screens, it had substantial limitations in its overall efficacy factors when used with high-resolution image and data projector components which became available after the development of the screen disclosed in the Mihalakis '980 patent. The compound optical surface curvature and combined convex-concave element functions fundamental to the Mihalakis '980 patent are insufficient in critical factors such as farfield curvature, projector pixel resolution transmission, attainable optical specular polish and image contrast enhancement. These deficiencies are caused by the inherent properties of the screen surface disclosed in the Mihalakis '980 patent.

When used as a rear-projection transmission screen, the limitations of the screen disclosed in the Mihalakis '980 patent are due in total to its mathematically compound surface curvature construction, which is very important to the art disclosed in the Mihalakis '980 patent. In particular, these limitations in Mihalakis '980 and other relevant prior art are:

1) Limitations in the efficacy of its gain characteristic, which is caused by field curvature in the gain distribution far field. Field curvature reduces the screen's applicability and efficiency.

2) Limitations in the attainable specularity of the compound modulations of the optical surface. Inadequate specularity reduces the applicability and efficacy of a screen because it results in low light output (perceived by the viewer is low brightness).

3) Limitations in the element's ability to optically compress its focused image through an optional contrast mask on the exit surface.

4) Limitations in the element's surface's ability to transmit high resolution images having high pixel densities.

Thus, the screen disclosed in the Mihalakis '980 patent, as well as other prior art screens, have significant limitations.

Thus, there is a need for screen for a rear projection television with the following characteristics:

1) Low field curvature, thereby allowing more efficient containment of the image brightness within the desired viewing angles.

2) High specularity, which will provide improved "gain" and contrast to the projected image. This is extremely important because most televisions are located and viewed in rooms with large amounts of ambient light.

3) The ability to optically compress the focused image through a contrast masks on the exit surface, which is a technique used by the screen manufacturer.

4) The ability to transmit high resolution images, i.e., high pixel densities.

The present invention discloses a screen for use with rear projection televisions, computer monitors and other displays that provides these characteristics.

SUMMARY OF THE INVENTION

A new type of screen for a rear projection television apparatus is disclosed which provides flexible viewing angles, high gain, excellent optical characteristics, and the ability to display high-resolution images at reasonable screen sizes. The present invention comprises an image projector beam transmission apparatus comprising a matrix of a juxtaposed plurality of a purely refractive specular element. The optical action of the element of the present invention results in separate and dissimilar refractive optical focusing powers in the two angular directions perpendicular to its optical axis. At the same time, the element of the present invention ensures that no compound, rotational or mixed curvatures exist in or on the contours of the surface. Instead, the present invention has a 'pure' modulation function, meaning that at any point on the surface, the modulation function does not share components between the two axes. Thus, the present invention comprises a singular refractive element suitable for arrangement in repeating juxtaposition arrays along both axes perpendicular to the optical axis with separate and distinct focusing power along each axis. Its complete curvature function yields neither a compound surface, a surface of rotation, nor a surface of mixed-modulation between the two axes perpendicular to the optical axis, but rather a pure modulation which does not share curvature components between said axes. Additionally, the refractive element of the present invention provides an aggregate focus of all rays incident thereto, through a localized area on its material exit surface suitable for optional contrast masking.

The dimensions of the element of the present invention will vary depending on the projected-image application. As with any repeating or corrugated projection surface, the element is usually designed to ensure that the screen element dimension subtends an angular separation some factor less than the angle subtended by the dimension of the image projector's pixel at the image size demanded by the application.

The construction and arrangement of the matrix of transmission screen imaging elements according to the present invention provides many advantages over the prior art. One exemplary advantage is better containment of the impinging image light energy within a determined viewing zone. Another advantage of the present invention is increased transmission efficiency and brightness gain. Another advantage is increased optical specularity. Another advantage of the present invention is the elimination of far-field curvature in its gain characteristic. Another advantage of the present invention is substantially smaller array element dimensions. Yet another advantage of the present invention is increased transmission of high resolution image detail, which is due to the individual element mathematical surface construction. The element's mathematical surface construction, to be discussed in detail below, produces separate and distinct specular focusing actions in the two planes perpendicular to the optical axis, without distortion, rotation or mixed-modulation of the surface curvatures in those planes, or in the resulting gain distribution far-field. Another advantage of the present invention is that it is favorable to a contrast mask.

One advantage of an inventive aspect of the present invention is to provide an improved image projection beam transmission means.

Another advantage of an inventive aspect of the present invention is to provide an improved rear-projection screen.

Another advantage of an inventive aspect of the present invention is to provide a rear-projection screen having a higher degree of specularity on its optical surface.

Another advantage of an inventive aspect of the present invention is to provide a micro-optic rear-projection screen that refracts incident light differentially in the two angular dimensions of the viewing field without producing field curvature.

Another advantage of an inventive aspect of the present invention is to provide a rear-projection screen which operates solely on a refractive imaging lens element array and can be designed to refract projected light into an angular volume containing two separate and distinct distribution angle components along the two axes perpendicular to the optical axis.

Another advantage of an inventive aspect of the present invention is to provide a rear-projection screen without any amount of optical diffusion as its distribution medium.

Another advantage of an inventive aspect of the present invention is to provide a controlled image projection transmission means wherein a plurality of point images combine to present a continuous image.

Another advantage of an inventive aspect of the present invention is to provide a rear-projection screen providing improved containment of the projected light impinging on the screen by providing improved gain-profile characteristics.

Another advantage of an inventive aspect of the present invention is to provide a rear-projection screen embodied with refractive elements that are mathematically constructed without surface curvature modulation.

Another advantage of an inventive aspect of the present invention is to provide a matrix element that repeats in both axes perpendicular to the optical axis which can be embodied smaller in axial dimension than a projected image pixel in a high resolution rear-projection display.

Thus, in an aspect of the present invention, an apparatus for effecting the display of image rear-projection beams incident thereupon is disclosed. This presently preferred embodiment comprises a plurality of similar focusing lens units possessing separate and distinct optical refracting power in both principle axes perpendicular to the optical axis. The plurality of similar focusing lens units are disposed in substantially contiguous relation and repeating along both principle axes perpendicular to the optical axis. Each lens unit comprises an optically transmitting refractive surface. To construct the surface, a singularly distinct and constant aspheric contour residing in a plane defined by the optical axis and the second perpendicular axis is displaced in the optical axis with respect to the first perpendicular axis.

In another aspect of the present invention, an image projection beam transmission apparatus is disclosed which comprises a sheet of optical bulk material volume having a material exit surface and an optical surface. An optical axis is substantially perpendicular to a plane defined by said optical surface. The material exit surface comprises a substantially planar surface. The optical surface comprises a matrix of focusing lens units where each focusing unit has separate and distinct optical refracting curvature in both a first principle axis perpendicular to the optical axis and a second principle axis perpendicular to the optical axis. The first principal axis is perpendicular to the second principal axis. Each of the optical focusing elements are disposed in substantially contiguous and integral relation and repeat along the first and second principle axes. Each lens unit comprises an optically transmitting refractive surface. To construct the surface, a singularly distinct and constant aspheric contour residing in a plane defined by the optical axis and the second perpendicular axis is displaced in the optical axis with respect to the first perpendicular axis.

In yet another aspect of the present invention, an image projection beam transmission apparatus is disclosed which comprises a sheet of optical bulk material having a material exit surface and an optical surface. An optical axis is substantially perpendicular to a plane defined by the optical surface. A first principle axis is perpendicular to the optical axis and a second principle axis is perpendicular to the optical axis. The first principle axis is perpendicular to the second principle axis. The image projection beam transmission apparatus also comprises a plurality of iterative optical elements integrally disposed on the optical surface which repeat along the first principle axis and the second principle axis. Each of the plurality of iterative optical elements comprises a refractive surface having separate and distinct optical refracting curvatures in both the first principle axis and the second principle axis. Each lens unit comprises an optically transmitting refractive surface. To construct the surface, a singularly distinct and constant aspheric contour residing in a plane defined by the optical axis and the second perpendicular axis is displaced in the optical axis with respect to the first perpendicular axis.

In other aspects of the present invention, the second order curve can be any conic section curve, such as an ellipse, a parabola, a hyperbola or a circle.

The above and other preferred features of the invention, including various novel details of implementation and combination of elements will now be more particularly described with reference to the accompanying drawings and pointed out in the claims. It will be understood that the particular methods and apparatus embodying the invention are shown by way of illustration only and not as limitations of the invention. As will be understood by those skilled in the art, the principles and features of this invention may be employed in various and numerous embodiments without departing from the scope of the invention.

BRIEF DESCRIPTION OF THE DRAWINGS

Reference is made to the accompanying drawings in which are shown illustrative embodiments of aspects of the invention, from which novel features and advantages will be apparent.

DETAILED DESCRIPTION OF THE DRAWINGS

Turning to the figures, the presently preferred apparatus and methods of the present invention will now be described.

Figure 1:
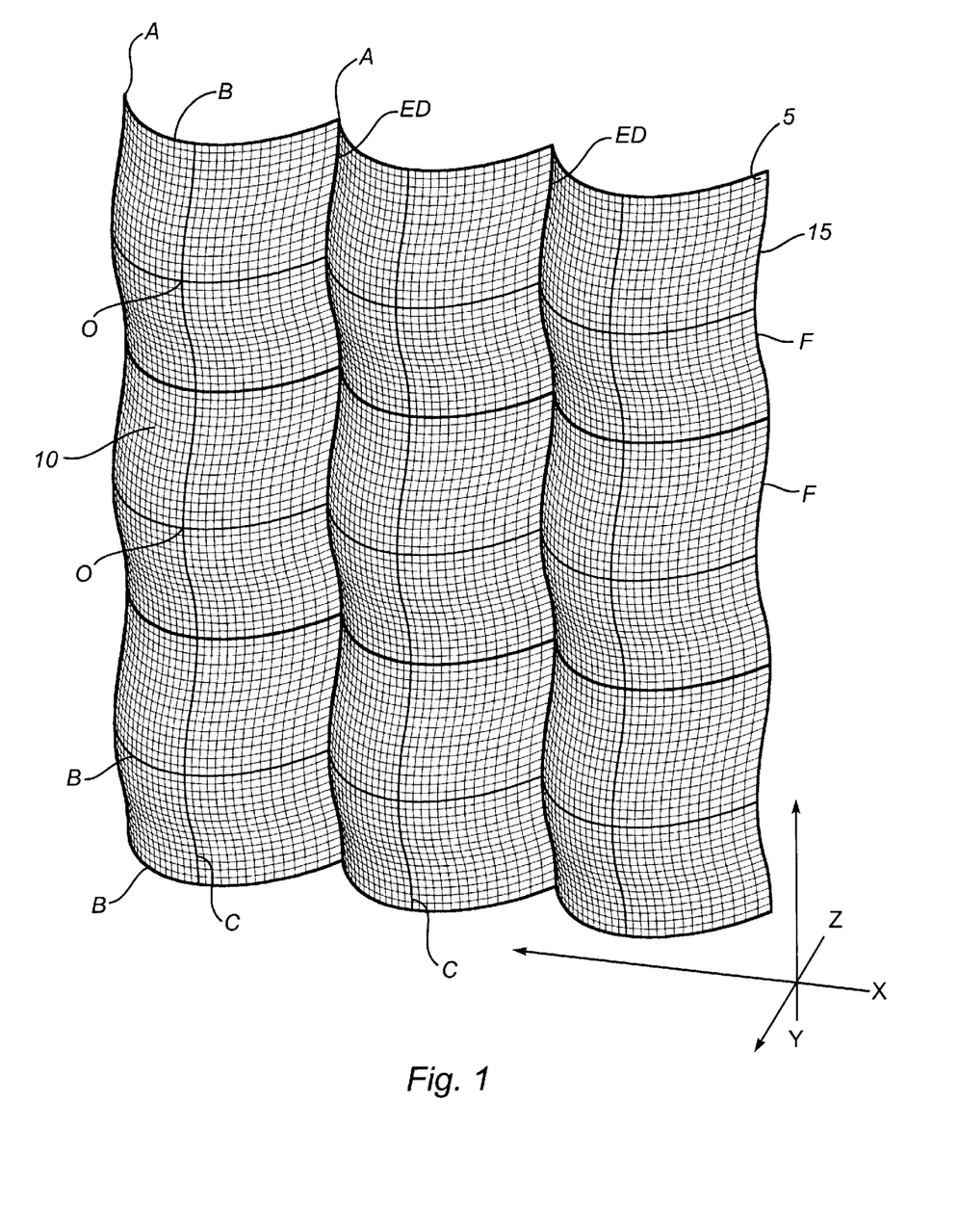
FIG. 1 is an oblique view of a portion of an image-projection beam transmission apparatus according to the invention.
Figure 6A:
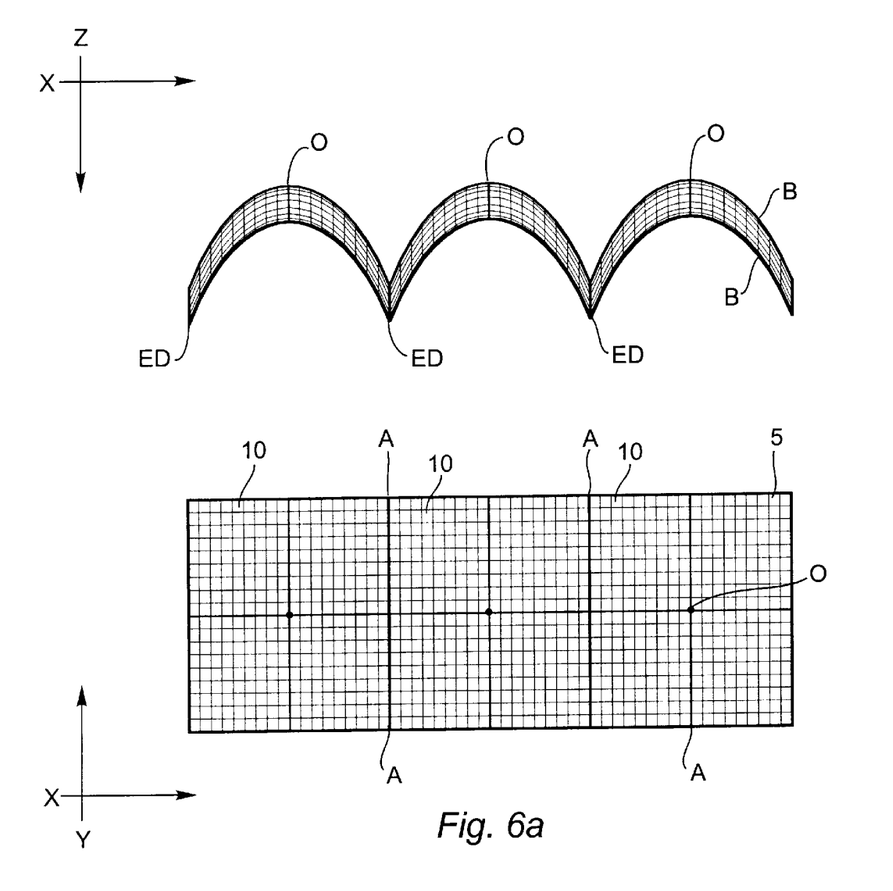
FIGS. 6a and 6b shows side and top views relative to the plan view of portions of adjoining elements and the repeating optical curves formed thereby at different positions on the element.
Figure 6B:
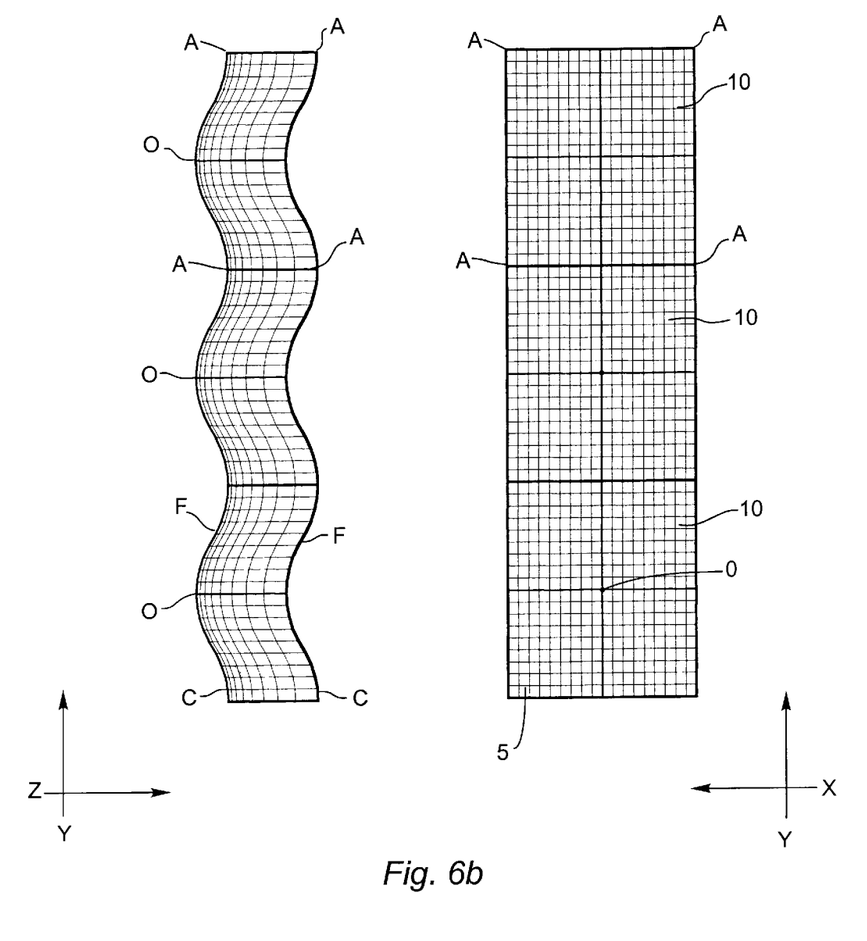

Referring now to FIG. 1, a portion of the presently preferred embodiment of the image projector transmission apparatus 5 of the present invention is shown. The image projector transmission apparatus 5 (i.e., a screen 5) comprises a plurality of elements 10 arranged to form a matrix of rows and columns. As shown in FIG. 1, the matrix of elements defines a surface with respect to the X, Y and Z planes, which is shown in FIG. 1. For clarity, the Z-axis shown is generally referred to as the "optical axis," while the X-axis and Y-axis are generally referred to as the "axes perpendicular to the optical axis." FIGS. 6a and 6b show portions of the matrix in plan view, with top and side views relative to the plan view, which will be discussed in greater detail below. The terms X-axis, Y-axis and Z-axis are used herein as conventions for describing location and orientation. It is to be understood that any use of directions, such as upwards, downwards, top, bottom, side, X-axis, Y-axis, Z-axis, etc. are merely for purposes of description and are not used as a limitation on the orientation of any portion of element 10.

As seen in FIG. 1, screen 5 has a discontinuity (i.e., a fold) at the edges "ED" where each element 10 abut one another along the X-axis. This discontinuity forms an undulating line 15 along the Y-axis. No discontinuity exists along the Y-axis, as element 10 smoothly and continuously abuts with its neighboring element along the Y-axis such that the mating slopes in the joining region are equal and opposite, transitioning from concave to convex at the inflection point "F", thereby forming identical undulating Y-Z curves "C." Each element 10 has an apex "O" that defines the physical center of the element.

Figure 2A:
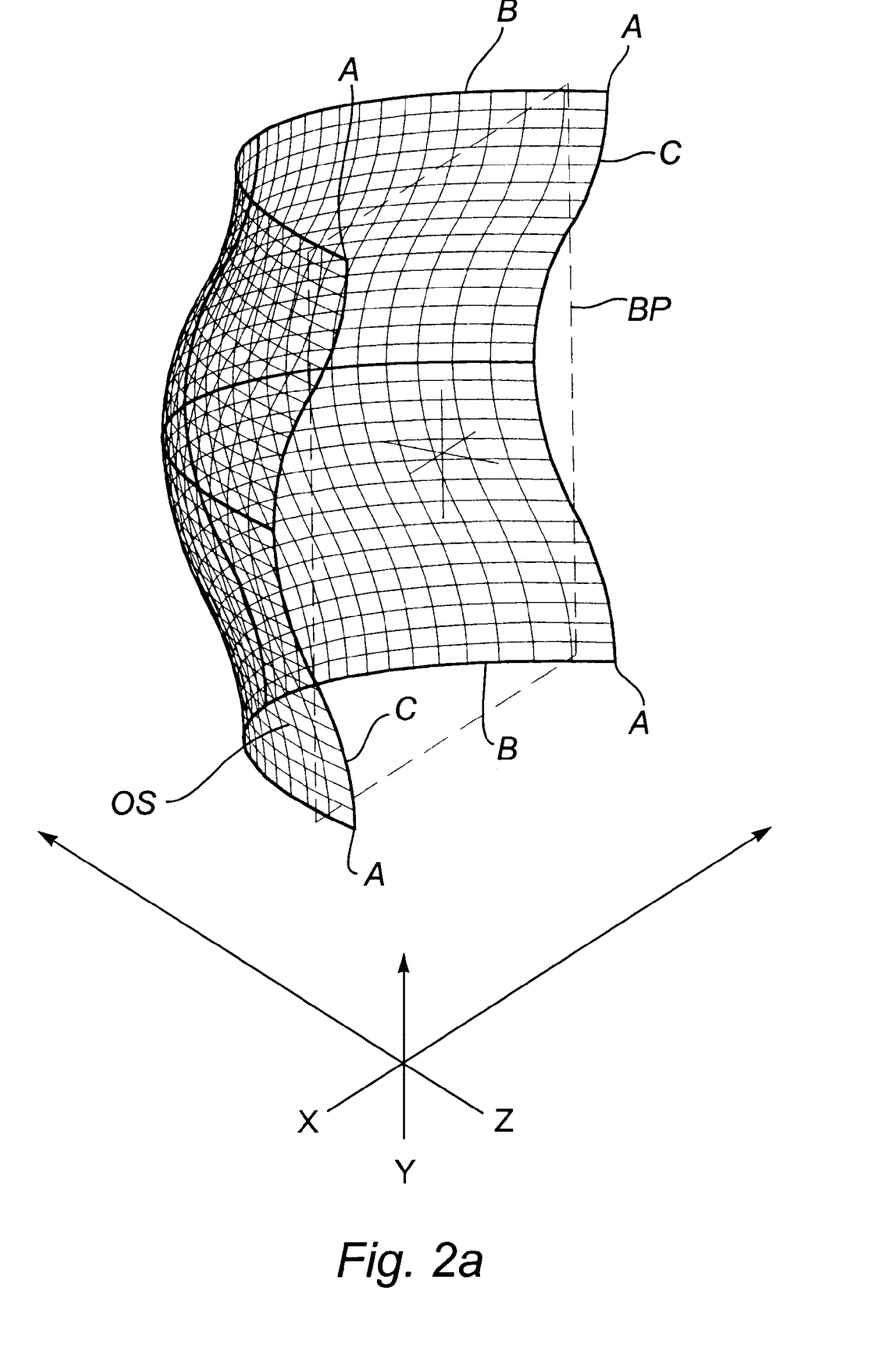
FIGS. 2a–2c are oblique, top and side views, respectively, of an individual element according to the invention.
Figure 2B:
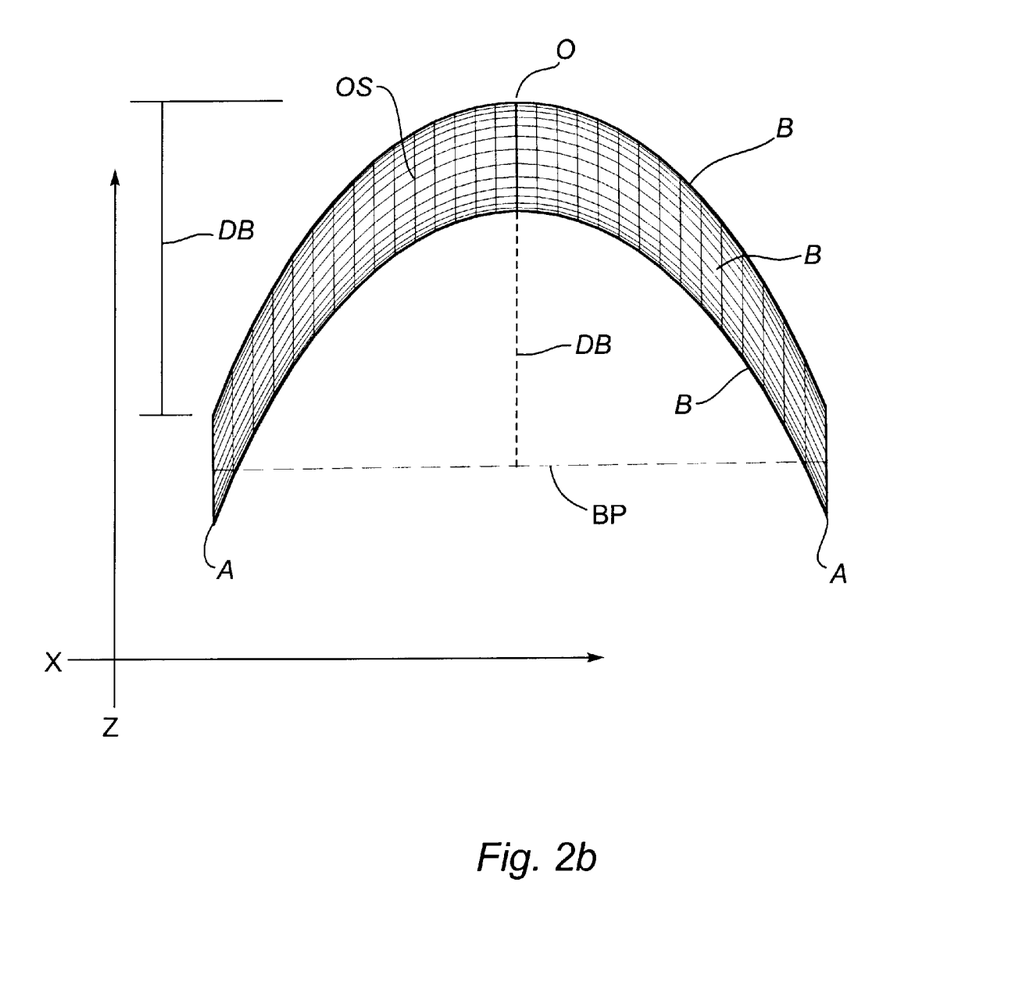
Figure 2C:
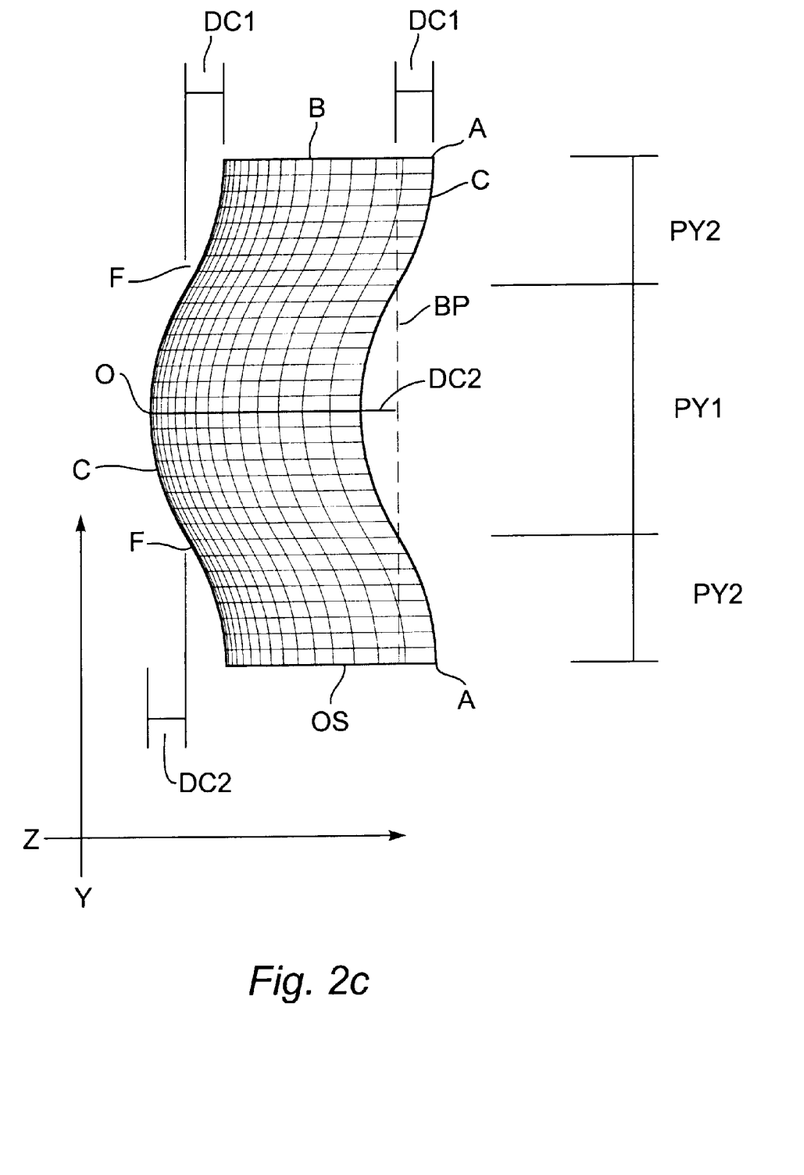

The preferred contour of element 10 is shown with reference to FIGS. 2a–2c. FIGS. 2a–2c illustrate oblique (X-Y-Z view), top (X-Z plane) and side (Z-Y plane) views, respectively, of the element 10. Referring to FIG. 2a, the oblique view, it can be seen that the presently preferred element 10 of the invention is preferably rectangular in its X-Y extent, with the dotted lines in FIG. 2a indicating the intersection of the element with the X-Y plane, or base-plane "BP" of the surface. A portion of the element surface extends below the X-Y base-plane "BP" at the margins of the element. The base-plane "BP" is not a physical object or surface. It is merely a mathematical reference plane containing the origin of coordinates, which on FIG. 2a is shown at the base-plane center.

Also shown in FIGS. 2a–2c is the optical surface "OS". The optical surface "OS" is the external surface onto which incident light is directed from the image projector. Thus, the person viewing a screen 5 constructed in accordance with the present invention will receive the light transmitted, directed and focused by element 10. As seen in FIG. 2a, the surface "OS" is purely convex in any X-Z plane section passing through the surface along the Y-axis. All sections parallel to the X-Z plane yield substantially optically identical aspheric convex curves "B", which are substantially identical and equal in all mathematical aspects of size, shape, and eccentricity. FIG. 2b shows element 10 when viewed along the Y-axis, which could also be referred to as a view from the top (or bottom) of the screen 5 comprised of a plurality of elements 10. As seen in the view of FIG. 2b, the identical convex aspheric curves "B" residing on the optical surface "OS" in the X-Z plane are substantially mathematically identical, varying only in their Z position between the apex "0" of the element and the margins "A" of the element. The depth "DB" of the contours "B" is thus also substantially identical for each contour.

FIG. 2c shows element 10 when viewed along the X-axis, which could also be referred to as a side view of a screen 5 comprised of a plurality of elements 10. As seen in FIG. 2c, the optical surface "OS" undulates between convex and concave at the inflection line "F" along undulating line "C". The convex portion of the undulating surface above the inflection line "F" is centered about the apex "0", as is the concave portion of the Y-axis surface, except that the concave portion is divided into two equal and opposite portions which reside on either side of the convex portion. All Y-Z plane sections also yield substantially identical continuous undulating curves along undulating line "C" with slopes blending at the inflection lines "F". It is important to note that while FIG. 2c illustrates the total convex periodicity "PY1" and the total concave periodicity sum "PY2+PY2" portions of the complete Y-Z surface contour as being proportionately equal in length, the invention is not limited to this. In fact, an element can be embodied in a screen at any chosen proportion between total concave and total convex periodicity of the Y-Z contour.

Figure 3:
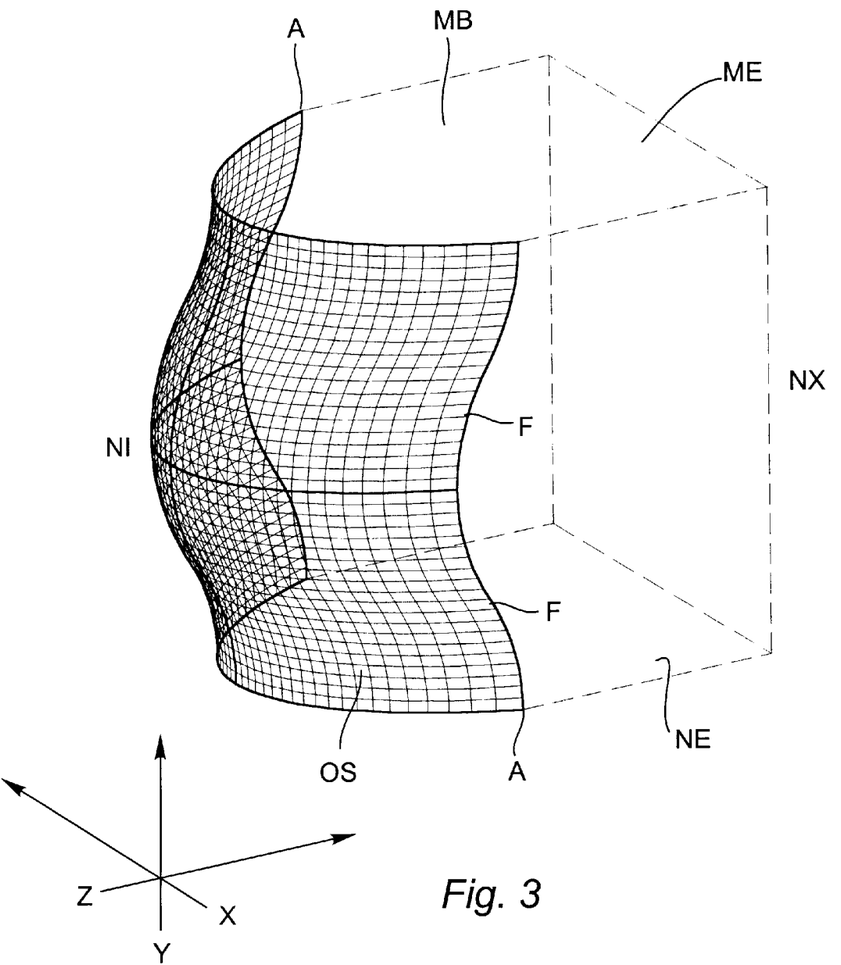
FIG. 3 is an oblique view of an individual surface element in its volumetric rendering as the refraction boundary of an optically transmitting material according to the invention.

A volumetric rendering of the optical surface "OS" as the refraction boundary of an optically transmitting material in an actual embodied transmission screen, is shown in FIG. 3. Screen 5 comprised of elements 10 that form optical surface "OS" is constructed from a refractive material such as, but not limited to, acrylic, glass, or polycarbonate sheet or other attendant material suitable to refract and transmit light. Still referring to FIG. 3, within this volume subtended by (i.e., the volume extended under) the optical surface "OS" is the material bulk region "MB" and the material exit boundary "ME". Upon refraction at the optical surface "OS", a portion of the incident projected beam is transmitted through the material bulk region "MB" until it reaches the material exit surface "ME", where it again refracts upon exiting the material. The material exit surface "ME" is usually but not limited to a flat, or optically plano, surface.

Again referring to FIG. 3, the material volume attendant to the optical element surface "OS" of element 10 when used in an embodied transmission screen is of a higher refractive index "$N_E$" than the incident medium "$N_I$". The incident medium index "$N_I$" is usually air (where refractive index=1) because this will be the interior of the rear projection television or computer monitor, though the invention is not limited to this. Similarly, the exit medium index "$N_X$" is usually air because this is typically the room in which the television or monitor is located, though the invention is not limited to this. It is to be understood that there are many applications for screens using the teachings of the present invention with other combinations of index mismatch at the refractive optical surface "OS". Also important to note is that the material exit boundary "ME" opposite the optical surface "OS" need not be the final exit surface index of the complete transmission screen assembly. This is due to the fact that the material from which the screen 5 is constructed can be embedded or index-coupled to other transmission components such as clear plastic or Fresnel panels or glass windows of distinct or dissimilar refractive indices.

Figure 4A:
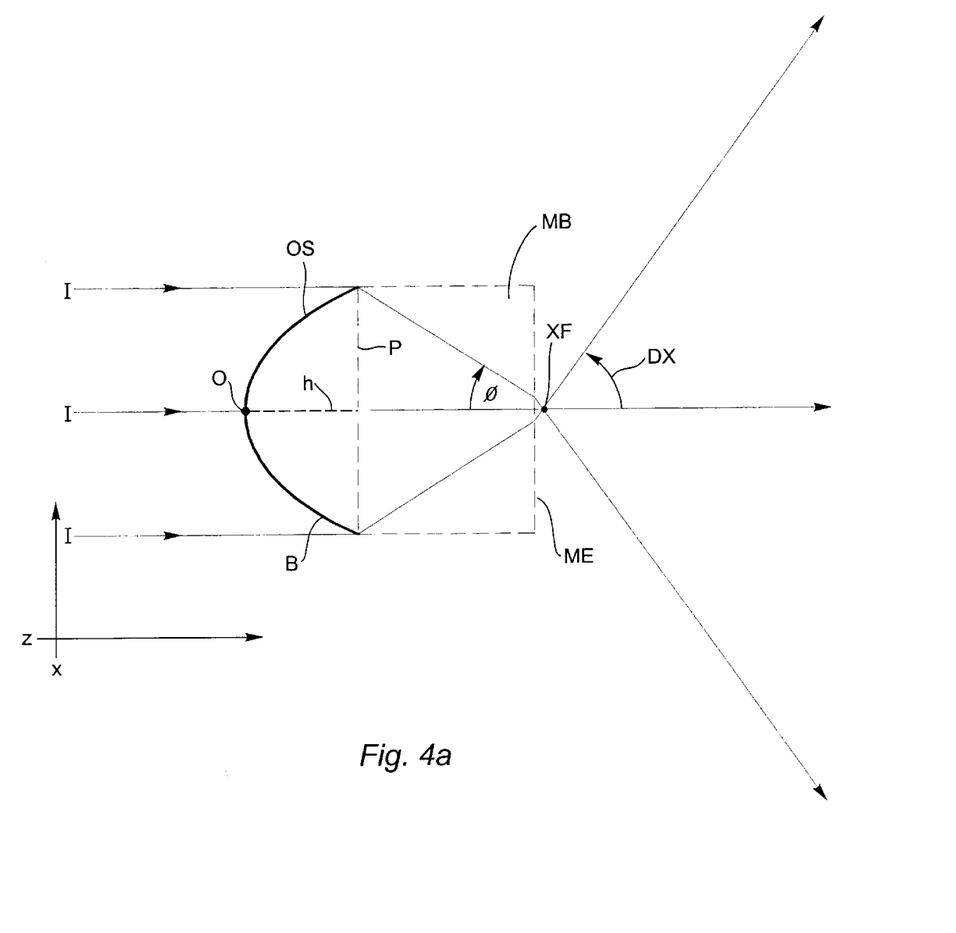
FIGS. 4a and 4b are top and side views, respectively, of the individual element showing its focal properties according to the invention.

The focal properties of element 10 differ the two principal axes perpendicular to the optical axis Z. This can be seen in FIGS. 4a and 4b. Referring to FIG. 4a, which illustrates one such contour "B" of the element top view in the X-Z plane, incident light "I" falling on the optical surface "OS" is refracted through the material bulk "MB" to a real-image focus "XF". This focus "XF" can be designed such that it occurs on either side of the material exit surface "ME". That is, the focus "XF" can be designed to occur before the exit surface within the material bulk "MB" itself, directly on the exit surface "ME", or beyond the exit surface "ME" in the exit medium. The specific application or use of the projection screen and its materials design determines the proximity of focus "XF" to the exit surface "ME". The X-axis component of element's 10 light distribution solid angle volume in the X-Z plane resulting from the real-image X-Z refractive focus is shown in FIG. 4a as "DX".

Figure 4B:
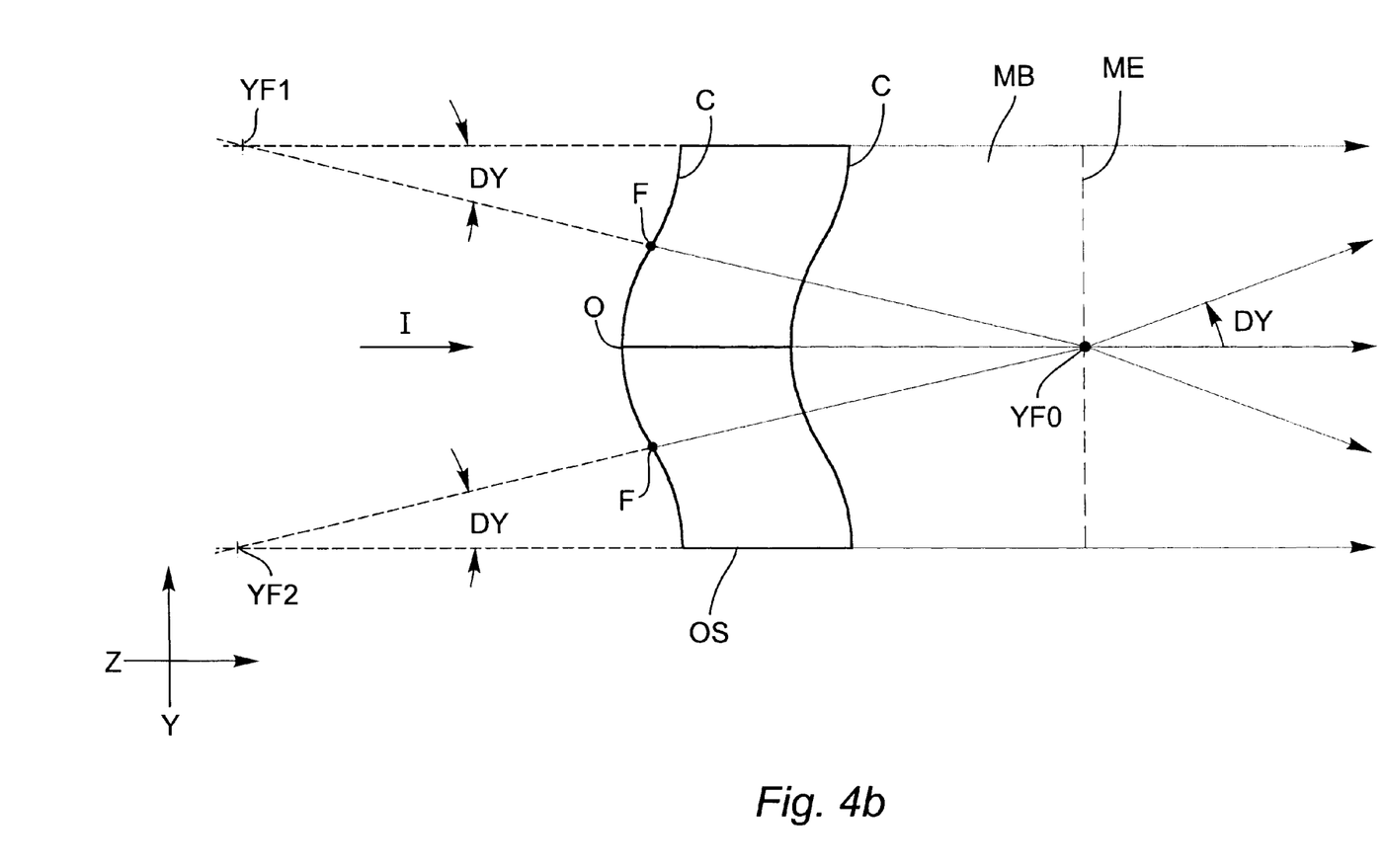

Referring to FIG. 4b, which illustrates the complete element side view in the Y-Z plane, the focal properties of the refractive element 10 optical surface "OS" are divided between its convex and concave portions, producing two separate and distinct types of foci in the Y-Z plane. The convex portion of the element 10 centered at the element 10 apex "O" refracts the incident light "I" to a real-image focus "YF0". Similar to the case of the X-Z real-image focus "XF", the real-image focus' "YFO" proximity to the material exit surface "ME" is determined by the application for the screen 5 and materials design 9 (e.g., the index of refraction of the screen 5 material). The component of the element's 10 light distribution solid angle volume in the Y-Z plane resulting from the real-image Y-Z refractive focus is shown as "DY". The concave portions of the of the element refract the incident light "I" in the Y-Z plane to two virtual-image foci "YF1" and "YF2" that reside equidistantly on either side of the element 10 apex "O". The component of element's 10 light distribution solid angle volume in the Y-Z plane resulting from the virtual-image Y-Z refractive focus is also "DY", as seen in FIG. 4b. Due to the identical but inverse curvatures of the convex and concave portions of the optical surface "OS", both portions produce an identical angular light distribution component "DY" in the Y-Z plane. The ability to produce identical angular light distribution component "DY" in the Y-Z plane is a key advantage of the present invention because it makes it practical to embody the element 10 with very small dimensions. Notice that the undulation in the Y-axis (see FIG. 1) presents a smoothly continuous transition between the element margins. The concave portion delivers a virtual focus and the convex portion delivers a real focus, both with equal distribution angle. This physical transition, or rate-of-change, between concave and convex portions is the least abrupt when the concave and convex portions are equal and opposite, meaning a 1:1 size ratio between concave and convex portions. The advantage is that the surface is more practical to manufacture when element 10 has small dimensions if this Y-axis transition (i.e., its rate-of-change) at the boundary, is gradual. That is, the most gradual possible transition occurs when the portions are equal and opposite.

In FIGS. 4a and 4b, the real and virtual refractive foci "YF1", "YF2", "YFO" produced by the element 10 are shown as points for illustrative purposes only. In reality, the real and virtual refractive foci "YF1", "YF2", "YFO" produced by the element 10 are complete focal images produced by the total element curvatures, as is their resulting light distribution far-field components. Thus in practice, the replete extent of the image foci and light distribution solid angle volume are best established by considering all incident source rays through the refractive element using ray-trace methods for aspheric surfaces, which is known to those skilled in the art.

To understand the full scope of advantages provided by the present invention, it is necessary to understand the design of the element 10 shown in FIGS. 2a–2c, as well as the arrangement of the element 10 in the matrix as shown in FIG. 1. The present invention utilizes a unique mathematical construction of the element optical surface for its use as a rear-projection transmission screen. The unique surface construction of element 10 of the present invention provides significantly enhanced performance over the prior art. Thus, the present invention provides low field curvature, thereby allowing the viewer more efficiently contained viewing angles, high specularity, which provides "gain" and contrast to the picture data, the ability to optically compress its focused image through a contrast mask on the exit surface, and the ability to transmit high resolution image detail.

Figure 5A:
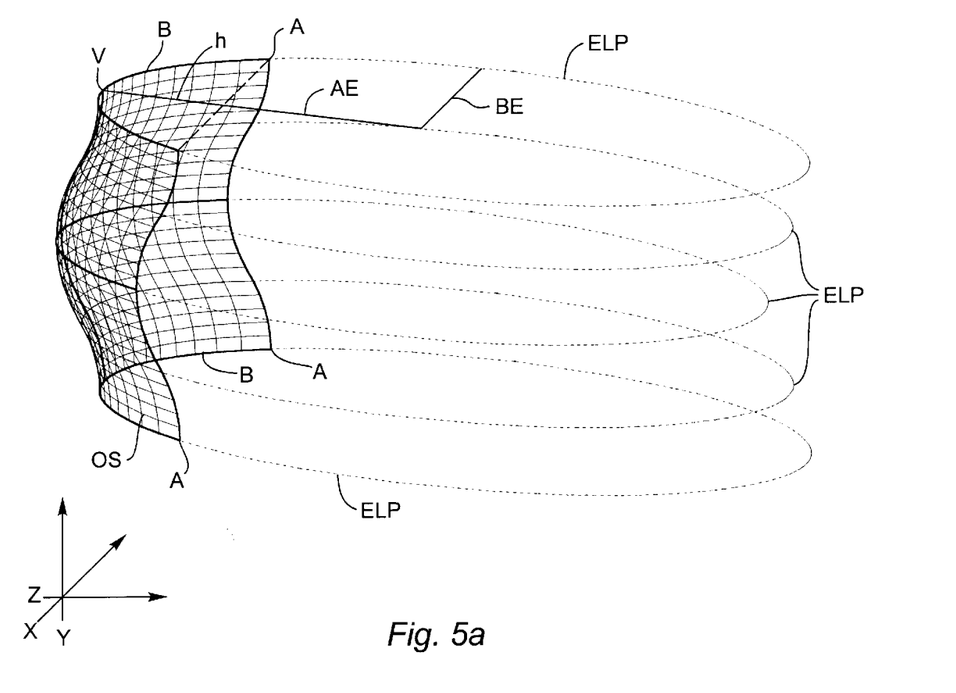
FIGS. 5a and 5b are oblique and orthogonal views, respectively, showing the mathematical construction of the individual element according to the invention.
Figure 5B:
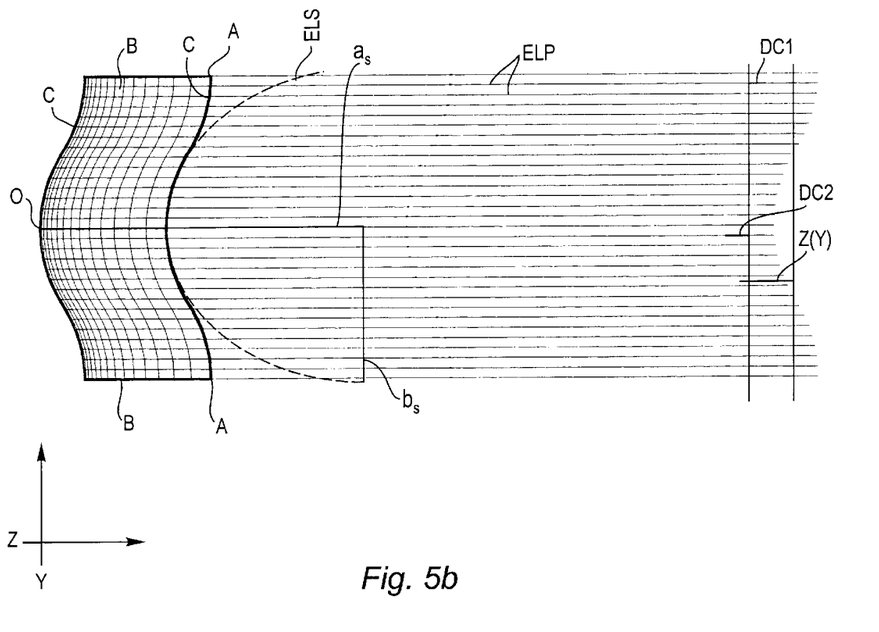

The advantages of the present invention over the prior art can be seen with reference to FIGS. 5a and 5b. The surface construction of element 10 begins with a primary second-order optically pertinent curve of specified eccentricity $\epsilon$. The choice of the primary optical curve relates to the desired aggregate gain profile characteristic function of the determined transmission screen. Any second-order conic section curve can be used to generate the surface, based on the analytic geometry functions as follows:

Ellipse: $0<\epsilon<1$
Parabola: $\epsilon=1$
Hyperbola: $\epsilon>1$
Circle: $\epsilon=0$ In the presently preferred embodiment, the most effective optical curve for transmission screen applications is an ellipse. It is noted, however, that while the ellipse is the most effective second-order curve in many cases, the invention is not limited thereto. With reference to FIG. 5a, the relationship between the curvature contours in the X-Z plane of the optical element 10 and the single primary ellipse "ELP" in the X-Z plane is shown. An ellipse can be parameterized in a number of ways pertinent to the invention. To illustrate the concepts of the present invention, the primary optical ellipse "ELP" is defined and parameterized by its major axis "$A_e$" and minor axis "$B_e$" dimensions. The locus of points on this primary ellipse in the X-Z plane is given as Z(X) by $$Z^2/A_e^2 + X^2/B_e^2 = 1$$

with eccentricity given by $$\epsilon = (A_e^2 - B_e^2)^{1/2}/A_e$$

Optical surface contour "B" embodied in element 10 of screen 5 is defined by a portion of the complete primary optical ellipse. Contour "B" is defined from the vertex "V" of the primary optical ellipse "ELP" to a determined distance "h" along the major axis "$A_e$". The distance "h" is the distance from vertex "V" out to the element corners "A". As discussed, each and every surface contour "B" is mathematically identical to any other surface contour "B" for any and all X-Z sections of the optical surface "OS". This is also true for primary ellipses "ELP", which are mathematically identical in all X-Z sections of the optical surface "OS". The only difference between the primary ellipses "ELP" is their particular Z-axis displacement. These characteristics are seen in FIGS. 5a and 5b. The primary ellipse "ELP" and it's associated contour "B" at the minimum displacement along the Z-axis passes through the corners "A" of the element 10. Likewise, the primary ellipse "ELP" and it's associated contour "B" at the maximum displacement along the Z-axis passes through the Apex "O" of the element 10.

The minimum and maximum Z-axis displacements of the primary ellipse are the "DC1" and "DC2" depth dimensions shown in FIGS. 2c and 5b, as referenced from inflection line "F". Between the minimum and maximum Z-axis displacement of the primary ellipse "ELP", the primary ellipse undergoes continuous Z-axis displacement as a function of its position along the Y-axis, defined by a secondary aspheric function Z(Y). As in the case of the primary X-Z function Z(X), this secondary Y-Z function can be a second order curve of any design eccentricity. An ellipse is again used in the presently preferred embodiment as the secondary Y-Z function. However, the invention is not limited to an ellipse. As seen in FIG. 5b, the secondary ellipse "ELS" is defined by major and minor axis dimensions $a_s$ and $b_s$ respectively. Thus the displacement of the primary ellipse as a function of its Y-axis position is given by $$Y^2/a_s^2 + X^2/b_s^2 = 1$$

Pertinent to the mathematical expression for the primary ellipse displacement function along the Y-axis is the modification of the secondary Z(Y) function to include separate convex and concave renditions of the function, which changes algebraic sign from positive to negative at the inflection "F".

FIG. 5b shows the Z-axis displacement of the primary aspheric ellipse "ELP" in the X-Z plane, along a path defined by the secondary aspheric ellipse "ELS" in the Y-Z plane, with maximum and minimum Z-axis displacements of the primary ellipse "DC1" and "DC2".

An important goal of the present invention is a sheer, fully fused presentation of the projected image through the transmission screen 5 surface. The physical size of each individual element 10 and the independent elemental image should be essentially subliminal and below the awareness threshold of the viewer's eyes at typical viewing distances. Since the element 10 is typically embodied to be physically smaller than the size which may be resolved at the predetermined viewing distance from the screen, the maximum dimensions of the element are substantially fused at that distance. For consumer television, element periodicity should be approximately 0.010 inches.

Another need to reduce the size of the element 10 to dimensions even smaller than that which can be resolved by the human eye at a determined viewing distance is spatial frequency interference between the image projector's pixel periodicity at the screen surface and the periodicity of the elements 10 themselves. According to sampling frequency interaction criterion established by the Nyquist theorem sampling principles, which in the spatial domain is often referred to as "moiré" interference," the periodicity dimensions of elements 10 on screen 5 must be at least one-half the dimension of the image pixel periodicity dimensions as projected onto the screen. Ideally, the periodicity dimensions of elements 10 on screen 5 should be at least one-third the dimension of the image pixel periodicity dimensions as projected onto the screen. Prior art transmission screens based on micro-optic array elements cannot be effectively embodied to produce elements having such small dimensions.

With reference to FIG. 4a, a presently preferred embodiment of the present invention using a parametric design example is described. Referring to FIG. 4a, the second-order aspheric optical contour "B" is shown in an X-Z section. A projector (not shown) projects incident rays "I" such that incident rays "I" impinge upon the element 10. Incident rays "I" refract toward real-image focus "XF". Incident rays "I" are then refracted again by the material exit surface "ME", which yields a light distribution half-angle "DX". The extent of the sectional aspheric curve "B" residing on the element surface is a portion of the complete primary ellipse, limited by one-half of the total determined element X-axis design periodicity, shown in FIG. 4a as the dimension "p". The dimension "h" is the fullest depth of the curve "B", centered at the element apex "O". Using optics terminology, the dimension "2p" represents the refracting element's "entrance pupil" extent and the dimension "h" represents the refractive element's "Sag" height.

As discussed above, the presently preferred embodiment uses elliptical geometry for element 10. However, one of ordinary skill in the art will recognize that the invention is not limited to an element 10 comprised of an ellipse. Parabolic, circular or hyperbolic geometries can also be used for an element 10 utilizing the teachings of the invention. We thus begin with the determined design definitions:

X-axis Element Half-Period: p

X-Z Element Sag Height: h

Primary Ellipse Eccentricity: $\epsilon$

Incident/Exit Refractive Index: $N_I$

Element Refractive Index: $N_E$

These characteristics of element 10 (entrance pupil period, Sag height and eccentricity) are a more convenient method in which to parameterize the primary ellipse comprising the presently preferred element's construction. Thus, the common ellipse constants $A_e$ and $B_e$ are not given as parameters and will be calculated. These ellipse constants $A_e$ and $B_e$ are expressed in terms of entrance pupil period, Sag height and eccentricity by the following:

$$A_e = \frac{1}{2} * (h+p)^2 / [h*(1-\epsilon^2)]$$

$$B_e = A_e * (1-\epsilon^2)^{1/2}$$

The points on the X-Z primary ellipse with origin of coordinates at the ellipse vertex is given by $$Z(X) = A_e * (1 - X^2/B_e^2)^{1/2} - A_e$$

The slope m of the ellipse at any point is given by $$m(X) = [\frac{1}{2} * A_e * (-2*X/B_e^2)] / (1 - X^2/B_e^2)^{1/2}$$

The slope angle M of the ellipse at any point is $$M(X) = \tan^{-1}[m(X)]$$

The angle n(X) of the normal at any ellipse point is $$n(X) = M(X) + \pi/2$$

A parallel incident ray impinging on the refractive interface of angle $\theta$ with respect to the normal is $$\theta_i(X) = n(X)$$

and this ray will bend within the refractive medium of index $N_E$ by Snell's Law, to an angle $\theta_1(X)$ with respect to the normal, given by $$\theta_1(X) = \sin^{-1}[(N_I/N_E) * \sin \theta_i(X)]$$

After transmission through the medium, this ray will again refract at the material exit surface "ME", taken here to be a plane with normal angle of zero degrees. This refracted ray has an angle $\phi_1(X)$ with respect to exit surface normal $$\phi_1(X) = \theta_1(X) + n(X)$$

The exiting ray will thus have angle $\theta_2(X)$ with respect to the exit surface normal $$\theta_2(X) = \sin^{-1}[(N_E/N_I) * \sin \theta_1(X)]$$

and the maximum ray "DX", which occurs at X=p, will have the value $$DX = \theta_2(X)|_{X=p} = \sin^{-1}[(N_E/N_I) * \sin \theta_1(p)]$$

"DX" is thus the marginal ray angle in the X-axis distribution field component.

Using a set of determined values for the preferred embodiment of the transmission screen element:

| | |
|---|---|
| P = .010" | $\epsilon$ = 0.88 |
| p = .0050" | $N_I$ = 1 |
| h = .0055" | $N_E$ = 1.55 |

This set of design conditions produces the following X-Z distribution field component margin angle, often referred to as the 'horizontal' distribution angle of the transmission screen, referenced to the optical axis:

$\phi$=30.4° (Internal margin-ray angle)

DX=49.3° (Exit margin-ray angle)

This process is repeated for the Y-Z distribution field margin angle, often referred to as the 'vertical' distribution angle of the screen. Whereas these angles represent the maximum angular rays emerging from the transmission element, the full representation of the refractive element's far-field gain function in all spatial dimensions and solid angles is best obtained by computer simulation, which considers all rays emanating from the image projection source, traced through all surface points of the element, to all points in the far-field.

The preferred embodiment of the present invention includes equal and opposite smoothly blending marginal portions of the element 10 in the Y-Z axis to eliminate undesired secondary scattering and to maximize gain and image containment within the determined light distribution field, and also to facilitate manufacturing. In other words, there is an equal and opposite 1:1 symmetry ratio between the smoothly blending marginal portions in the presently preferred embodiment. However, one of ordinary skill in the art will recognize that such equal and opposite smoothly blending marginal portions are not essential to the practice of the present invention in all applications. For example, the proportionality between the convex and concave undulations of the element in the Y-Z planes can be varied such that the symmetry ratio is higher. Exemplary symmetry rations include, but not limited to, 1:2, 1:4, 2:1, 4:1 or in fact can be designed to such high ratio proportion that either the convex or concave portions along the Y-Z plane vanish altogether, in which case at it's limit ∞:1, the marginal regions of the element will not connect smoothly in the Y-Z plane.

In yet another embodiment, an absorptive contrast mask (not shown) like those known in the art can be placed on the material exit surface in order to block certain angles of extraneous ambient light from entering through the transmission screen into the rear-projection cabinet (also not shown). Such an absorptive contrast mask covers the portions of the exit surface not subjected to the transmission of projected light focused by the elements and is typically embodied as a black absorbing material. The inclusion of a contrast mask in an embodiment of the invention does not affect the mathematical construction of the invention.

Further, the present invention is of course not limited to the illustrated configurations of the element and the matrix of elements, but extends to all configurations of elements and matrices utilizing the element construction geometry disclosed herein.

Thus, a preferred image projector output beam control apparatus of a transmissive nature has been described. While embodiments and applications of this invention have been shown and described, as would be apparent to those skilled in the art, many more embodiments and applications are possible without departing from the inventive concepts disclosed herein. The invention, therefore, is not to be restricted except in the spirit of the appended claims.

I claim:

1. An apparatus for effecting the display of image rear-projection beams incident thereupon, comprising a plurality of similar focusing lens units formed in an optical material, said lens units possessing separate and distinct optical refracting power in a first principle axis and a second principle axis, said first principle axis being perpendicular to said second principle axis, said first principle axis and said second principle axis both being perpendicular to an optical axis, said lens units disposed in substantially contiguous relation and repeating along said first principle axis and said second principle axis, each lens unit including an optically transmitting refractive surface, said optically transmitting refractive surface constructed by displacing in said optical axis with respect to said first principle axis a singularly distinct and constant aspheric contour residing in a plane defined by said optical axis and said second principle axis.

2. The image projection beam transmission apparatus of claim 1 wherein said constant aspheric contour comprises a conic section curve.

3. The image projection beam transmission apparatus of claim 2 wherein said constant aspheric contour comprises an ellipse.

4. The image projection beam transmission apparatus of claim 1 wherein said optical material comprises acrylic.

5. The image projection beam transmission apparatus of claim 1 wherein said optical material comprises glass.

6. The image projection beam transmission apparatus of claim 1 wherein said optical material comprises polycarbonate.

7. An image projection beam transmission apparatus comprising:

a sheet of optical bulk material having a material exit surface and an optical surface, an optical axis being substantially perpendicular to a plane defined by said optical surface;

said material exit surface comprising a substantially planar surface; and said optical surface comprising a matrix of focusing lens units, each focusing unit having separate and distinct optical refracting curvature in both a first principle axis perpendicular to said optical axis and a second principle axis perpendicular to said optical axis, said first principal axis being perpendicular to said second principal axis, each of said optical focusing elements disposed in substantially contiguous and integral relation, and repeating along said first and said second principle axes, each lens unit comprising an optically transmitting refractive surface constructed by displacing in the optical axis with respect to said first principle axis a singularly distinct and constant second order curve residing in a plane defined by said optical axis and said second principle axis.

8. The image projection beam transmission apparatus of claim 7 wherein said distinct and constant second order curve comprises an ellipse.

9. The image projection beam transmission apparatus of claim 7 wherein said optical bulk material comprises an acrylic material.

10. The image projection beam transmission apparatus of claim 7 wherein said optical bulk material comprises glass.

11. The image projection beam transmission apparatus of claim 7 wherein said optical bulk material comprises a polycarbonate sheet.

12. An image projection beam transmission apparatus comprising:

a sheet of optical bulk material having a material exit surface and a refractive optical surface, an optical axis being substantially perpendicular to a plane defined by said optical surface, a first principle axis perpendicular to said optical axis and a second principle axis perpendicular to said optical axis, said first principle axis being perpendicular to said second principle axis; and a plurality of iterative optical elements integrally disposed on said optical surface and repeating along said first principle axis and said second principle axis, each of said plurality of iterative optical elements comprising a refractive surface having separate and distinct optical refracting curvature in both said first principle axis and said second principle axis, said refractive surface displacing in said optical axis with respect to said first principle axis a distinct and constant second order curve residing in a plane defined by said optical axis and said second principle axis.

13. The image projection beam transmission apparatus of claim 12 wherein said constant aspheric contour comprises a conic section curve.

14. The image projection beam transmission apparatus of claim 13 wherein said conic section curve comprises an ellipse.

15. The image projection beam transmission apparatus of claim 12 wherein said distinct and constant second order curve comprises an ellipse.

16. The image projection beam transmission apparatus of claim 12 wherein said optical bulk material comprises an acrylic material.

17. The image projection beam transmission apparatus of claim 12 wherein said optical bulk material comprises glass.

18. The image projection beam transmission apparatus of claim 12 wherein said optical bulk material comprises a polycarbonate sheet.

* * * * *